United States Patent [19]

Daenen et al.

[11] Patent Number: 6,105,810

[45] Date of Patent: Aug. 22, 2000

[54] COOKWARE LID AND HANDLE ASSEMBLIES

[75] Inventors: Robert H. C. M. Daenen, Herne; Jean-Pierre F. M. Geelen, Hasselt; Jean-Marie DeCraim, Buggenhout; Johan M. J. K. Mortier, Grimminge, all of Belgium

[73] Assignee: Dart Industries Inc., Orlando, Fla.

[21] Appl. No.: 09/187,445

[22] Filed: Nov. 6, 1998

[51] Int. Cl.⁷ .............................. B65D 51/16; A47J 36/12
[52] U.S. Cl. ...................... 220/366.1; 220/369; 220/379; 220/912
[58] Field of Search .................................. 220/366.1, 212, 220/212.5, 379, 243, 244, 250, 251, 805, 796, 801, 802, 836, 841, 744, 912, 573.1; D7/360, 394; 99/324, 325, 339, 345; 126/373

[56] References Cited

U.S. PATENT DOCUMENTS

| | | |
|---|---|---|
| D. 281,050 | 10/1985 | Cesaroni et al. . |
| D. 347,963 | 6/1994 | Pretzsch . |
| D. 376,724 | 12/1996 | Mendelson et al. . |
| D. 386,354 | 11/1997 | Hoekstra . |
| D. 400,393 | 11/1998 | Ranzoni . |
| 0,946,271 | 1/1910 | Reeves . |
| 1,621,315 | 3/1927 | D'Evlyn . |
| 2,187,762 | 1/1940 | Uhlrig . |
| 2,258,145 | 10/1941 | Woodman ............................... 220/379 |
| 2,751,901 | 6/1956 | Livermore . |
| 3,081,394 | 3/1963 | arel et al. ............................. 220/379 X |
| 3,081,395 | 3/1963 | Wickenberg ......................... 220/379 X |
| 4,091,956 | 5/1978 | Vecchio . |
| 4,285,441 | 8/1981 | Ziskind . |
| 4,358,992 | 11/1982 | Behnisch . |
| 4,625,887 | 12/1986 | Ito . |
| 4,646,717 | 3/1987 | Baggioli . |
| 5,065,889 | 11/1991 | Conti . |
| 5,203,465 | 4/1993 | Baumgarten . |
| 5,388,714 | 2/1995 | Zutler . |

FOREIGN PATENT DOCUMENTS

| | | | |
|---|---|---|---|
| 20758 | 9/1930 | Australia | 220/366.1 |
| 152000 | 8/1952 | Australia | 220/366.1 |
| 2307718 | 11/1976 | France | 220/366.1 |
| 1045617 | 2/1956 | Germany | 220/379 |
| 1076924 | 3/1960 | Germany | 220/379 |
| 6-225834 | 8/1994 | Japan | 220/912 |
| 16438 | 1/1893 | United Kingdom | 220/366.1 |

OTHER PUBLICATIONS

Permanent® Model MC2000 Cookware Knob Assembly, The West Bend Company, West Bend, IN, 1995.

Primary Examiner—Nathan J. Newhouse
Attorney, Agent, or Firm—Taylor J. Ross

[57] ABSTRACT

Cookware lid and handle assemblies include a lid which may include a whistle knob assembly which provides an audible indication upon reaching cooking temperature. The whistle knob assembly includes a steam deflector portion to reduce burn danger to the user, and has a simplified structure and assembly method. The vessel includes a pair of side handles, and the lid includes a pair of finger protectors which may overlie the side handles. Each set of side handle and finger protector have a unique mating relationship. As such, in the mated position a lid rim rest upon a vessel rim. The lid may be rotated 180 degrees to rest non-mating finger protector and side handles. This lack of mating relationship causes the lid to be spaced upward, permitting venting or draining of the interior. The finger protectors may also fit within a handle aperture in the side handle. The user may tilt the lid to insert the finger protector into the handle aperture, abutting the finger protector within the handle aperture, and permitting the lid to rest in an access position.

2 Claims, 4 Drawing Sheets

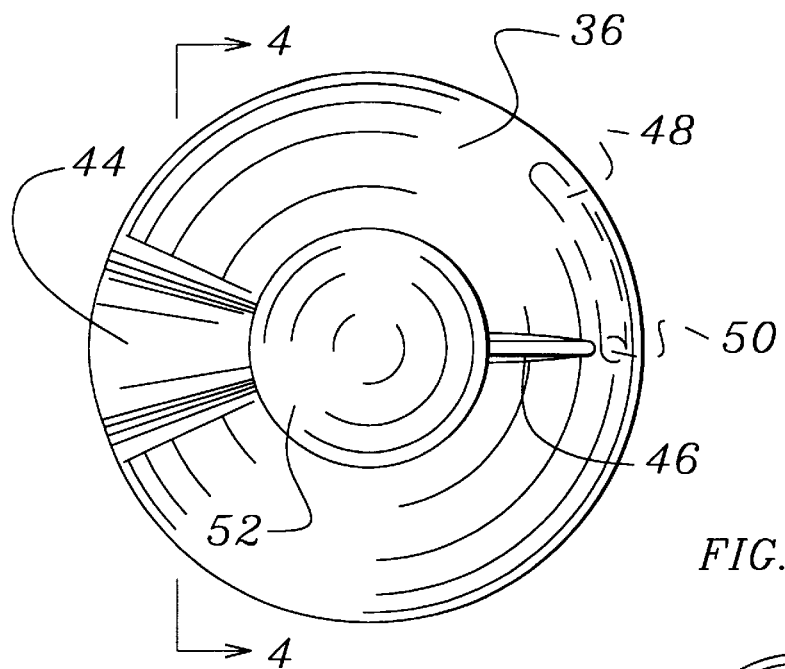
FIG. 3
FIG. 4
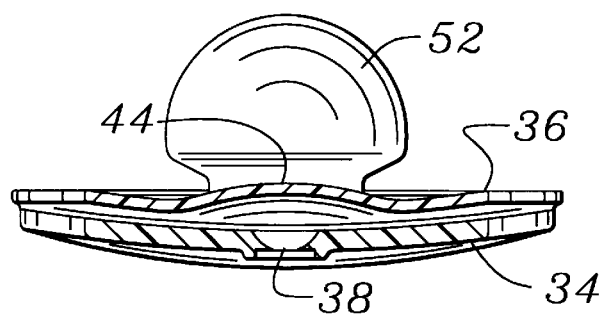
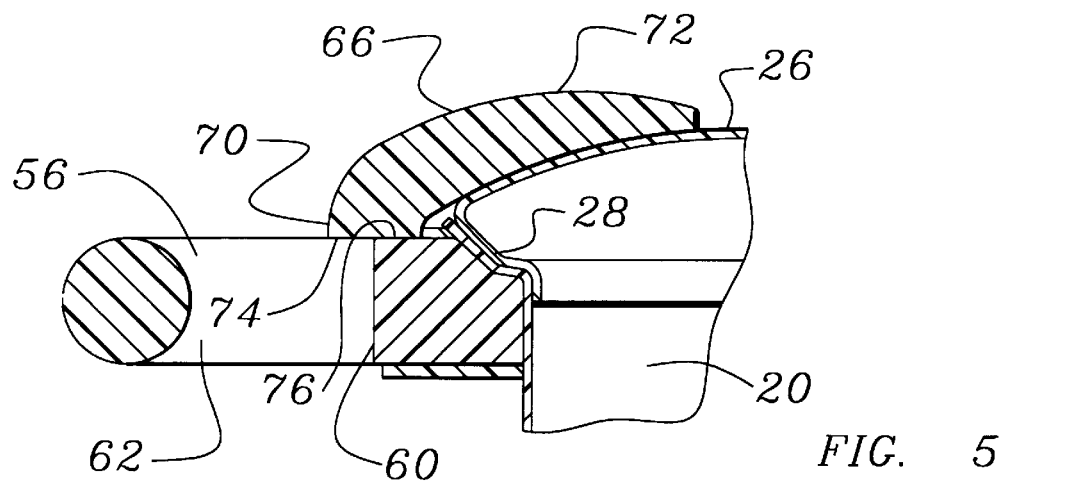
FIG. 5

COOKWARE LID AND HANDLE ASSEMBLIES

CROSS-REFERENCE TO RELATED APPLICATIONS

This application is related to Ser. No. 29/096,231, filed Nov. 6, 1998, Ser. No. 29/096,229, filed Nov. 6, 1998, Ser. No. 29/096,230, filed Nov. 6, 1998, Ser. No. 29/096,232 filed Nov. 6, 1998, Ser. No. 29/096,233, filed, Nov. 6, 1998, which are incorporated by reference herein and made a part hereof, including but not limited to those portions which specifically appear hereinafter.

STATEMENT REGARDING FEDERALLY SPONSORED RESEARCH

Not Applicable.

BACKGROUND OF THE INVENTION

The present invention relates in general to cookware, and more specifically covered pots or casseroles. In particular, the present invention relates to improved features for audibly indicating the creation of a pressure seal, for venting the cookware, and for supporting the cookware lid when not in use.

Cookware is typically divided into various general groups, of which pots and pans are two. Pots include relatively deep vessels, while pans are relatively shallow. Both may employ lids to enclose the vessel. Both types of cookware have common problems, with these problems being shared with other, similar cookware types (such as woks) to certain extents.

In a known type of cookware, the vessel and its lid are designed to form a water seal therebetween as the food in the vessel reaches a cooking temperature. Once this seal is formed, the heat supplied to the vessel may be reduced, saving energy, while still providing proper cooking due to increased internal pressure in the vessel. To alert the user when this seal has been formed, this cookware also included a whistle insert within the lid. When the seal was formed, the steam venting from the vessel was precluded for exiting between the vessel and lid (due to the water seal itself). This steam was instead forced to flow through the whistle insert, and the increased flow upon forming of the seal produced a whistle sound due to the structure of the insert. The user could then rotate a portion of the lid to cover and block the whistle insert, stopping the sound, and sealing the interior of the vessel.

While this arrangement was beneficial, the whistle insert had drawbacks. Specifically, it was rather expensive to produce. Further, it had to be separately assembled to the lid. Finally, it was difficult to clean, and required removal from the lid for complete cleaning.

It has also been known to provide cookware with various arrangements for permitting venting of the interior. In more sophisticated devices, the lid may include one or more vent apertures with closing members movable to seal or permit venting through the lid. If the lid includes no such apertures, the it is common for the user to place the lid on the vessel in a tilted or off-center manner to create venting apertures. Both arrangements have drawbacks. The apertures and closing members are difficult to clean, and if broken may cause venting at all times. Placing the lid on the vessel off-center greatly increases the risk that the lid may fall, causing a spill and creating a burn danger to the user.

Finally, during cooking it is often necessary to remove the lid for a period of time to permit access to the interior for adding ingredients, etc. This requires either that the user hold the lid with one hand, or place the lid in a separate location. Holding the lid is tiresome to the user. Placing the lid in a separate location requires sufficient space to receive the lid, which may not be available. Additionally, placing the lid in a separate location may possibly contaminate the lid, which then contaminates the food in the vessel upon lid replacement.

SUMMARY OF THE INVENTION

An object of the present invention is to provide cookware which has a water seal and whistle indicator, and which is inexpensive and easy to clean.

Another object of the present invention is to provide cookware which has the ability to hold the lid in either a sealed position or a venting position.

A further object of the present invention is to provide cookware which permits the user to tilt the lid to an access position in which it is retained.

These and other objects are achieved by cookware lid and handle assemblies. The lid may include a whistle knob assembly which provides an audible indication upon reaching cooking temperature. The whistle knob assembly includes a steam deflector portion to reduce burn danger to the user, and has a simplified structure and assembly method. The vessel includes a pair of side handles, and the lid includes a pair of finger protectors which may overlie the side handles. Each set of side handle and finger protector have a unique mating relationship. As such, in the mated position a lid rim rest upon a vessel rim. The lid may be rotated 180 degrees to rest non-mating finger protector and side handles. This lack of mating relationship causes the lid to be spaced upward, permitting venting or draining of the interior. The finger protectors may also fit within a handle aperture in the side handle. The user may tilt the lid to insert the finger protector into the handle aperture, abutting the finger protector within the handle aperture, and permitting the lid to rest in an access position.

BRIEF DESCRIPTION OF THE DRAWINGS

The objects and features of the invention noted above are explained in more detail with reference to the drawings, in which like reference numerals denote like elements, and in which:

FIG. 3 is a detail top plan view of the lid knob and whistle vent assembly, with the lid removed for clarity;

FIG. 4 is a cross-sectional view along line 4—4 of FIG. 3;

FIG. 5 is a cross-sectional side view illustrating the lid resting upon the vessel in a lowered position;

DETAILED DESCRIPTION OF THE INVENTION

Figures 1, 2:
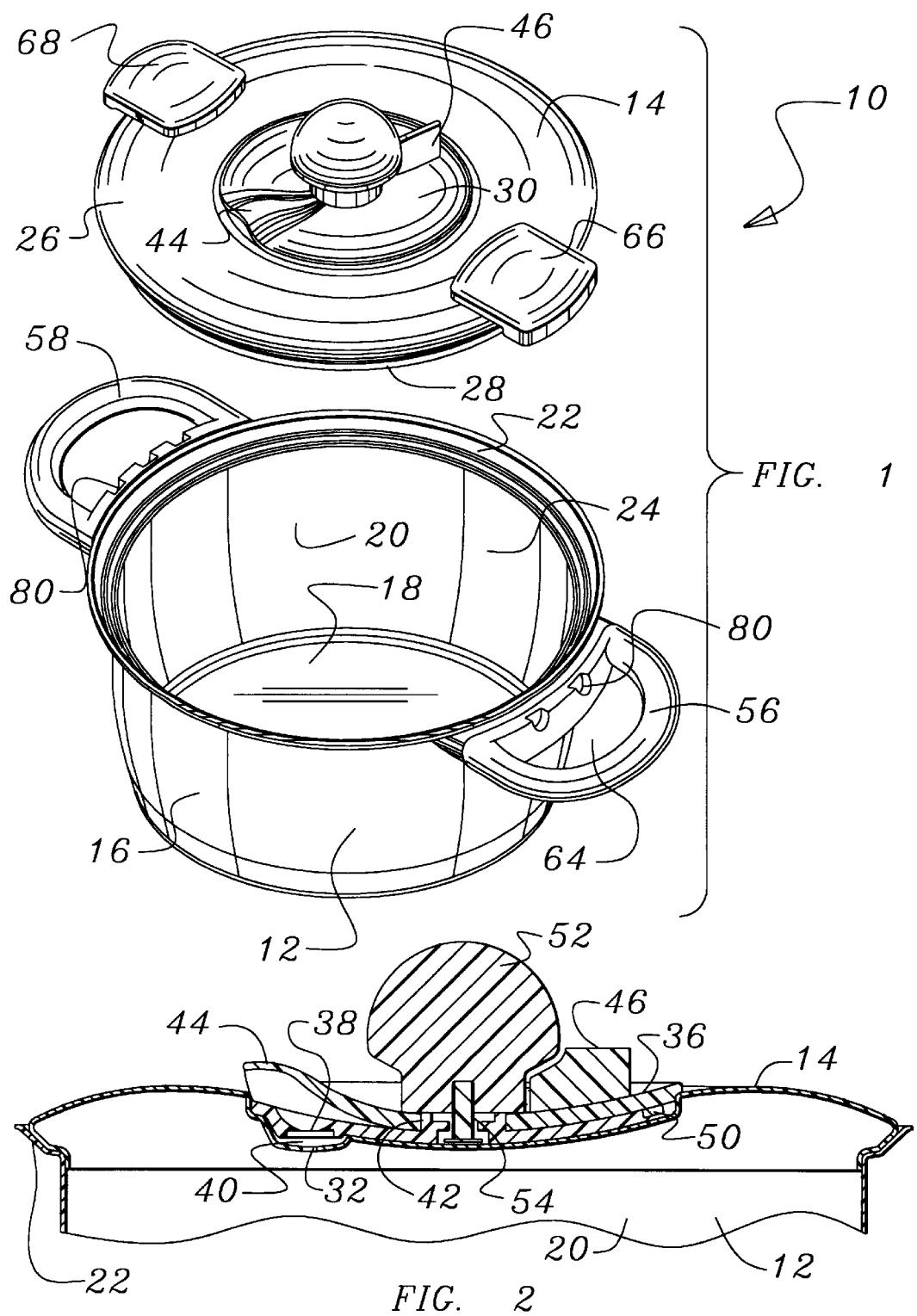
FIG. 1 is an exploded perspective view showing an embodiment of a cooking vessel and lid according to the present invention.
FIG. 2 is a cross-sectional side view illustrating the whistle feature.

With reference to FIG. 1, cookware according to the present invention is generally designated by reference numeral 10. The cookware 10 includes a vessel 12 which will receive the food to be cooked, and a lid 14 which may be used to cover and close the vessel 12. The major portions of the cookware 10 may be of any type known in the art, with the inventive features of the present invention useable with a wide variety of shapes and sizes of the major parts.

For the vessel 12, the major parts comprise the main body 16, which generally includes a bottom 18 having an outer periphery. This outer periphery is preferably round, but may take other shapes such as square. One or more sidewalls 20 extend upward from the periphery of the bottom 18 to a vessel rim 22. The bottom 18, sidewalls 20 and vessel rim 22 are preferably formed as a monolithic unit from a common material such as ceramic, metal or other material having sufficient heat resistance. While preferred, this is not required, and the vessel rim 22 or other portions may be made from diverse materials. The bottom 18, sidewalls 20 and vessel rim 22 together define an interior 24 which will receive the food (not shown). The proportions of the bottom 18 and sidewalls 20 may vary as known between pots, pans, woks, etc. In the embodiment shown, the sidewalls 20 are sufficiently tall that the cookware 10 is in the form of a pot or casserole, but sidewalls 20 of lesser height may be used to form a pan.

The lid 14 takes the general form of a disc (or other shape to mate with the vessel 12), and includes a lid body 26 having an outer periphery which defines a lid rim 28. The lid rim 28 is of a size and shape to mate with the vessel rim 22. As is well known, the lid 14 may rest upon the vessel rim 22 to close the interior 24. The lid body 26 and lid rim 28 are preferably formed as a monolithic unit from a common material such as metal, but may be formed of diverse materials, such as the lid body 26 being formed of glass or ceramic while the lid rim 28 is formed of metal. Further, the lid body 26 may be formed of several components of diverse (or similar) materials, such as a central metal portion surrounded by an annular glass portion (not shown).

With the general form of the cookware 10 thus described, the particulars of the present invention will now be described. The first aspect of the invention which will be discussed is a whistle knob assembly 30.

To begin, operation of the whistle knob assembly 30 requires that the lid body 26 include a steam aperture 32 extending therethrough which will permit steam from the interior 24 to exit through the lid 14. In this regard, it is greatly preferred that the vessel rim 22 and lid rim 28 have a mating relationship which will form a water seal during the early stages of steam generation, as is known in the art. This water seal will (at least during an initial period before the internal pressure ruptures the water seal) force the generated steam to pass through the steam aperture 32, rather than between the vessel rim 22 and lid body 26. The whistle knob assembly 30 controls the flow of steam through the steam aperture 32.

As shown, the whistle knob assembly 30 is preferably centrally mounted to the lid body 26, and includes a base plate 34 and a vent plate 36. The base plate 34 includes a whistle aperture 38, and the base plate 34 is mounted to place the whistle aperture 38 in a substantially coaxial relationship with the steam aperture 32. The lower face of the base plate 34 adjacent the whistle aperture 38 is formed as a generally concave surface to define a whistle cavity 40 between the whistle aperture 38 and lid body 26, as shown. This whistle aperture 38 may be enlarged by forming a concavity in the lid body 26, also as shown. Further, the outer face of the base plate 34 adjacent the whistle aperture 38 is formed as a section of an ellipsoid (or as a sphere) intersecting the whistle aperture 38 at a position so as to form the whistle aperture 38 with a very small height. In other words, the edge of the whistle aperture 38 are relatively narrow or sharp. With this configuration (the dimensions of which may be determined through simple experimentation) the whistle aperture 38 will produce an audible sound (likely due to vortex shedding from the sharp edge) upon reaching a predetermined pressure (dependent upon the dimensions chosen) within the interior 24.

This arrangement is quite simple compared to prior art whistle inserts, as the steam aperture 32 (and any surrounding concavity) may be formed during stamping or forging of the lid body 26, and the whistle aperture 38 may be formed simply by standard molding techniques which would typically be used to form the central knob for a cover. As such, no special materials, additional inserts or fabrication techniques are required to produce an audible sound upon reaching cooking temperature. To further simplify this arrangement, the base plate 34 may preferably be secured to the lid body 26 by crimping of the lid body 26 about the periphery of the base plate 34, as shown. This will eliminate the need for any fasteners or other special assembly items, further simplifying the arrangement.

While the user should be alerted upon reaching a cooking temperature, such that the heat may be reduced, it is of course desirable to be able to halt the audible sound. To this end the vent plate 36 is mounted to the lid body 26 such that it may be selectively movable into a position to block the flow of steam through the whistle aperture 38. In the preferred embodiment shown, the base plate 34 includes a central annular collar 42 extending upward therefrom, and the vent plate 36 has a central aperture which closely receives the collar 42. With this arrangement, the vent plate 36 may thus rotate with respect to, and upon, the base plate 34. By forming a portion (not shown) of the vent plate 36 with a radial length sufficient to extend beyond the whistle aperture 38, this portion may be moved into, and out of, covering relation to the whistle aperture 38.

While this is technically all that is required, it is noted that the audible sound is produced by steam escaping through the lid 14. This steam presents a burn hazard, and as such, it is preferred that the base plate 34 additionally be formed with a steam deflector portion 44 in the form of an included angle which is raised above, and spaced from, the base plate 34. The remainder of the vent plate 36 is in close sliding relation to the base plate 34, and as such, the entire periphery of the vent plate 36 may be made to conform to that of the base plate 34, as shown. The user may rotate the vent plate 36 to an operative position in which the steam deflector portion 44 overlies the whistle aperture 38, permitting steam to escape and the audible sound to be produced, or may rotate the vent plate 36 to an inoperative position in which the steam deflector portion 44 is not overlying the whistle aperture 38, and the remainder of the vent plate 36 blocks the flow of steam and thus prevents the audible sound.

To assist in this, the vent plate 36 may be provided with an upstanding handle flange 46 which the user may manually grasp to cause rotation of the vent plate 36. Further, one of the base plate 34 or vent plate 36 may be formed with an elongated groove 48, and the other of the base plate 34 or vent plate 36 may be formed with a pin 50 (best shown in FIG. 3) which fits within this groove and slides therein during rotation of the vent plate 36. As may be envisioned, this will limit rotation of the vent plate 36 within a specified range determined by the length of the groove 48. This rotation will, however, be sufficient to move the steam deflector portion 44 into, and out of, overlying relation to the whistle aperture 38. As such, the user may readily control the venting to halt the audible sound and seal the interior 24. Once so sealed, the user may reduce the heat applied to the cookware 10, and the increased pressure within the interior 24 will maintain a constant cooking rate despite this reduced heat input.

To permit the lid 14 to be easily removed and replaced, it is well known to provide a knob in the center of the lid which may be manually grasped. In the present invention, this may be formed by an extending the collar 42 of base plate 34 upward beyond the vent plate 36 (this embodiment not being shown). It is preferred, however, to provide a separate knob 52 mounted to lid body 26 (or alternatively to base plate 34). This may be achieved by securing a bolt 54 to the lid body 26 (such as by welding) coaxially within the collar 42, such that the free end of the bolt 54 extends above the collar 42. The knob 52 may have a threaded recess which receives the bolt 54 to secure the knob 52. Additionally, if the outer periphery of the knob 52, at its lower end adjacent the collar 42, extends outward beyond the collar 42 (as best illustrated in FIG. 2), this will serve to secure the vent plate 36 against upward movement. In this manner the provision of knob 52 can serve a dual function and eliminate the need for a separate fastening arrangement for vent plate 36.

The above arrangement will provide the prior art function of a water seal between the lid 14 and vessel 12, an audible indication of reaching cooking temperature, and the closing of the venting to permit the heat to be reduced to cook using less energy. Additionally, these functions are performed using fewer, and less expensive parts, and with easier assembly. Further, the vented steam providing the audible signal is deflected away from the knob for safety. Finally, the reduced number of parts provides for easier cleaning without disassembly of the various components.

This arrangement is one aspect of the invention. A further aspect is the provision of an arrangement to permit the user to easily alternate between a seated arrangement for the lid 14 for providing a seal, and an elevated arrangement for the lid 14 for providing vented cooking or draining of liquid.

Specifically, the vessel 12 is provided with first and second side handles 56 and 58, respectively. The side handles are mounted to the sidewalls 20 at diametrically opposed locations, as illustrated in FIG. 1. The side handles may be mounted using any technique common in the art. Further, they may take any shape desired. In the embodiment shown, they take the form of D-shaped members having a mounting section 60 abutting the sidewalls 20 and a semicircular grasping section 62 extending therefrom, and thus defining a handle aperture 64 therebetween. Alternatively, the side handles 56 and 58 could be formed as simple blocks (not shown) having no handle aperture 64. Further, one of the side handles 56 and 58 could be an elongated rod (not shown) extending radially outward, such as are commonly employed for pans. Regardless of the form, each side handle will include some type of mounting section adjacent to the sidewalls 20.

Further, the lid 14 is provided with first and second finger protectors 66 and 68, respectively. Each finger protector is mounted to the lid body 26 at a diametrically opposed location, such that each finger protector may be associated with a side handle (first to first, and second to second). Each finger protector includes at least a flange portion 70 extending radially outward beyond the lid rim 28. In the embodiment shown, each finger protector also includes a rest portion 72 extending inward of the lid rim 28, which will be discussed in more detail below. As best shown in FIG. 5, the vertical placement of the side handles and thickness of the finger protectors is also important. Specifically, when the lid 14 is in a sealed position as shown therein (i.e., with the lid rim 28 resting upon the vessel rim 22), a lower face 74 of each finger protector 66 and 68 may be in close proximity to an upper face 76 of each side handle 56 and 58.

Finally, each associated set of side handle and finger protector will have a unique mating pattern embossed in the respective lower face 74 and upper face 76. This pattern may take various forms. In the embodiment shown, one of the first side handle 56 and first finger protector 66 includes two lift projections 78 extending vertically therefrom, and the other of the side handle and finger protector includes two mating projection rests 80 extending vertically therein (see FIG. 6). Similarly, one of the second side handle 58 and second finger protector 68 includes three lift projections 78 extending vertically therefrom, and the other of the side handle and finger protector includes three mating projection rests 80 extending vertically therein. As such, in the embodiment shown, at least the number of lift projections 78 and projection rests 80 are unique to each pair of side handle finger protector. The spacing between the lift projections 78 may also be unique between each pair.

Figure 6:
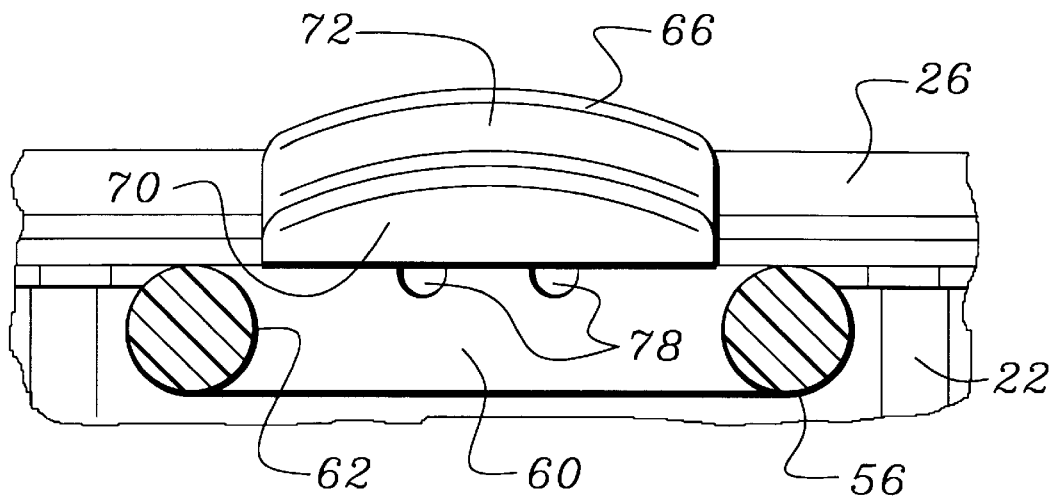
FIG. 6 is a cross-sectional end view of the position of FIG. 5.
Figure 7:
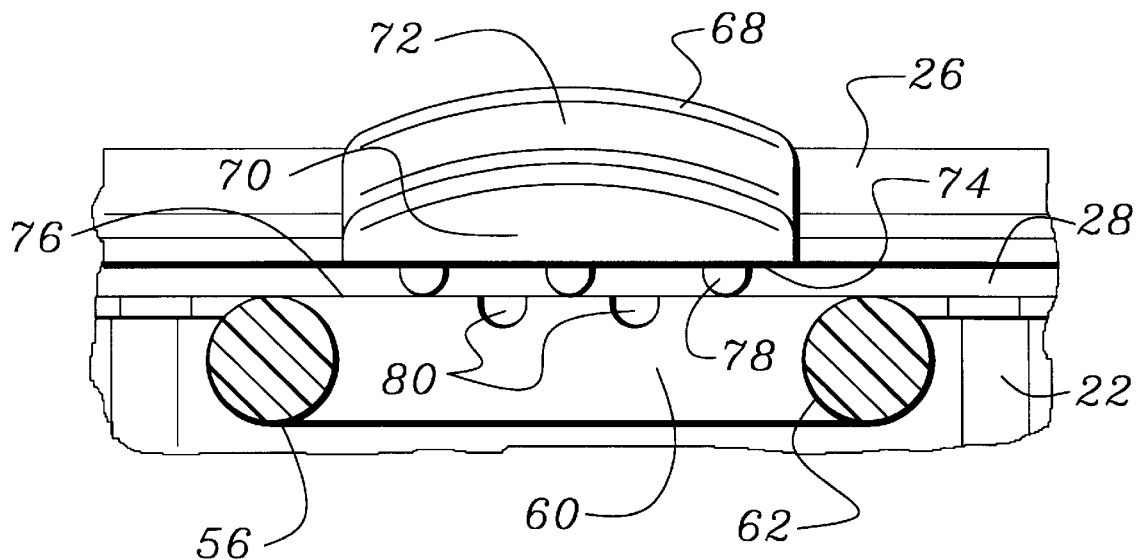
FIG. 7 is a cross-sectional end view similar to FIG. 6, but illustrating the lid in a raised position.

With this arrangement, when the lid 14 is placed upon vessel 12 with an angular orientation (i.e., clocking) such that the first finger protector 66 overlies the first side handle 56 (and thus the second finger protector 68 overlies the second side handle 58), the lift projections 78 will mate with the projection rests 80, and the lid will be in the sealed position of FIGS. 5 and 6. However, if the user rotates the lid 14 by 180 degrees, such that the first finger protector 66 overlies the second side handle 58 (and vice versa), the lift projections 78 will not mate with the projection rests 80. This will result in the lift projections 78 spacing the finger protectors, and thus the entire lid 14, from the vessel 12. This is referred to as the venting position of the lid 14, and is illustrated in FIG. 7. As may be envisioned, the lid rim 28 will be spaced from the vessel rim 22 in this venting position. Further, the relative spacing between the lift projections 78 ensures that the lid 14 is relatively stable in this position, and does not tilt.

As may be seen, this arrangement permits the user to fully seal the interior 24 of the cookware 10, or to space the lid 14 by a simple action. In this spaced, venting position the steam may escape from the interior 24 as is appropriate for certain types of cooking, such as reducing. Further, the user may grasp the side handles while simultaneously pressing upon the finger protectors with the thumbs to firmly retain the lid 14 in this venting position. When so held, the user may tilt the cookware 10 to drain liquid therefrom, with the relatively small spacing between the vessel rim 22 and lid rim 28 acting as a strainer.

Figure 8:
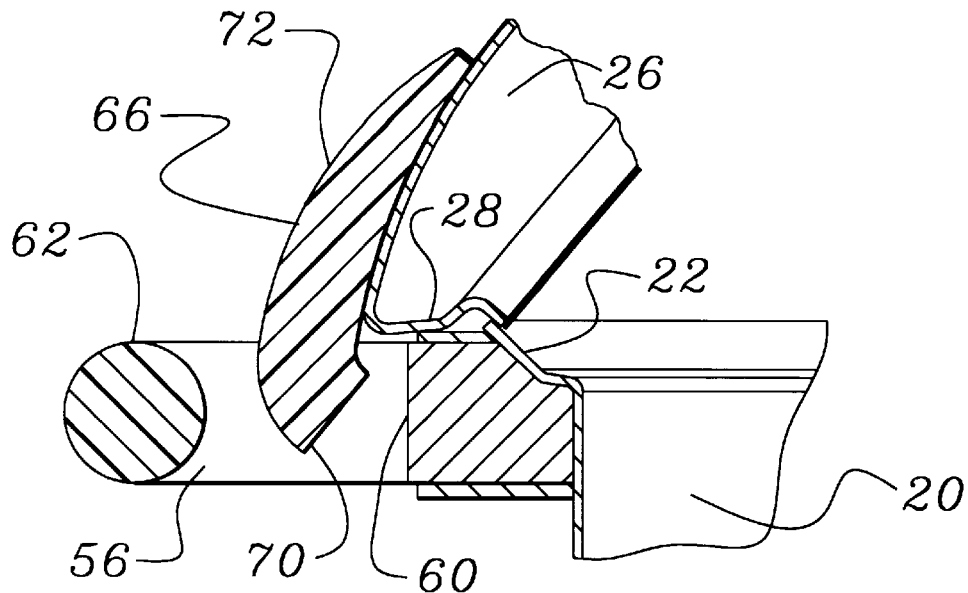
FIG. 8 is a cross-sectional side view similar to FIG. 5, but illustrating the lid in a partially open position.
Figure 9:
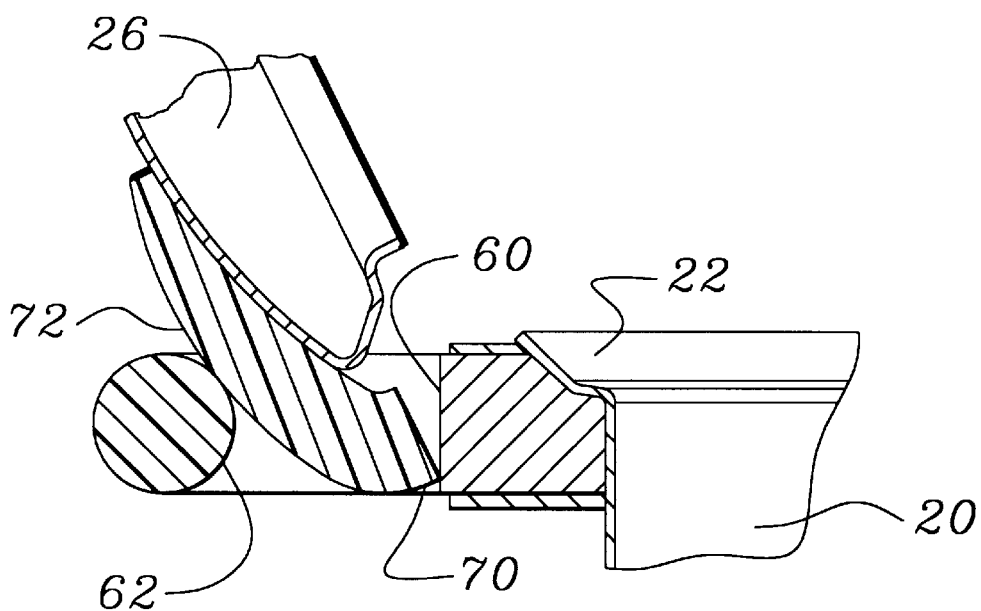
FIG. 9 is a cross-sectional side view similar to FIG. 5, but illustrating the lid in a supported fully open position.

A further aspect of the present invention is the provision of an arrangement to permit the user to retain the lid 14 in an open position so that the interior 24 may be accessed more easily. This is best illustrated in FIGS. 8 and 9.

Specifically, the handle aperture 64 of each side handle is sized to receive the finger protectors therein. Further, each finger protector has a length sufficient such that, when the lid 14 rests upon the grasping section 62 of the side handle, the flange portion 70 of the finger protector may abut against the mounting section 60 to support the lid 14 between the grasping section 62 and mounting section 60 in an access position. In this access position the longitudinal axis of the lid 14 is at an obtuse angle with respect to the longitudinal axis of the vessel 12, and the lid 14 is supported in a near vertical plane. This is shown in FIG. 9

As stated generally above, the lid 14 will rest upon the grasping section 62. This is meant to encompass various relationships. For example, FIG. 9 illustrates a laterally central portion of the rest portion 72 of the finger protector abutting the grasping section 62 of the side handle. While not shown, the lateral edges of the rest portion 72 could abut the grasping section 62, while the laterally central portion does not. Further, while also not shown, the finger protector could have a relatively small height and width, such that only the edge of the lid body 26 abuts the grasping section 62. Any of these arrangements, and others within the skill of the art, are meant to be encompassed.

With this arrangement it may be seen that the user may employ the cookware 10 with the lid 14 in either the sealed or venting positions. The user may then lift and tilt the lid through the position shown in FIG. 8 to insert the finger protector into the handle aperture 64, and then rest the lid 14 upon the side handle in the access position of FIG. 9. While in this access position, the user may inspect the contents of the cookware 10, add ingredients, etc. Further, it is noted that this access position can be achieved regardless of whether the lid 14 is in the sealed or venting positions (i.e., the second finger protector 68 will fit within and be supported by the first side handle 56). This arrangement permits the user to avoid contamination of the lid 14, and does not require additional space for storing the lid 14 while it is removed. It is further noted that it is preferred that the lid rim 28 taper inwardly toward its free edge, as shown, a sufficient amount such that any condensate on the inner face of the lid 14 will be retained within the lid rim 28 as it is tilted to the access position.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims. In particular, the whistle feature may be employed on cookware which does not have handles permitting venting or resting in an access position. Similarly, the use of the finger protectors to hold the lid in the venting position may be employed without of the use of the whistle feature or access position feature. Finally, the use of the finger protectors and side handles to rest the lid in the access position may be employed without the use of the whistle feature or the handles permitting the lid to be placed in the venting position.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A cookware handle assembly, comprising:

a vessel having a bottom and at least one sidewall extending upward therefrom to a vessel rim;

a lid having a lid rim sized and shaped to rest upon said vessel rim in a sealed position;

first and second side handles mounted to said sidewall at diametrically opposed locations, and each having an upper face;

first and second finger protectors mounted to said lid at diametrically opposed locations, and each having a lower face, said first side handle and said first finger protector defining a handle set and said second side handle and said second finger protector defining a second handle set, each said set having a unique mating relationship between said upper face and said lower face, said mating relationship permitting said upper face and said lower face to be in close vertical proximity when said first finger protector overlies said first side handle and said lid rim rests upon said vessel rim, and wherein said lid may be rotated 180 degrees such that said first finger protector overlies said second side handle and a lack of said unique mating relationship spaces said lid rim from said vessel rim.

2. An arrangement as in claim 1, wherein said unique mating relationship comprises at least one lift projection extending from one of said first finger protector and said first side handle, and a like number of mating projection rests extending into the other of said first finger protector and said first side handle, and at least two lift projections extending from one of said second finger protector and said second side handle, and a like number of mating projection rests extending into the other of said second finger protector and said second side handle, the number of said lift projections being different between said sets.

\* \* \* \* \*